Dec. 8, 1942. W. G. DAVIS 2,304,771
CUTTER
Filed April 16, 1941 2 Sheets-Sheet 1
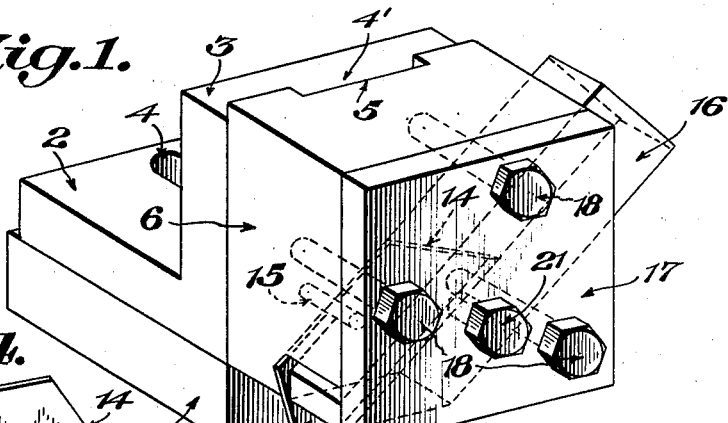
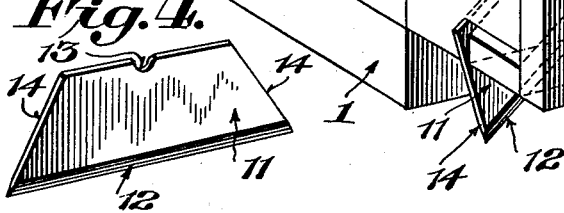
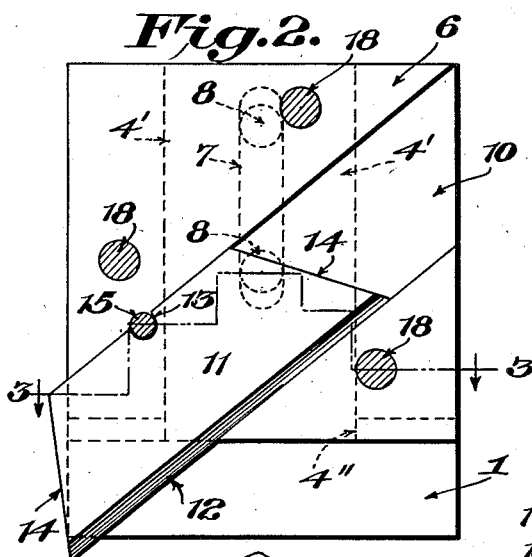
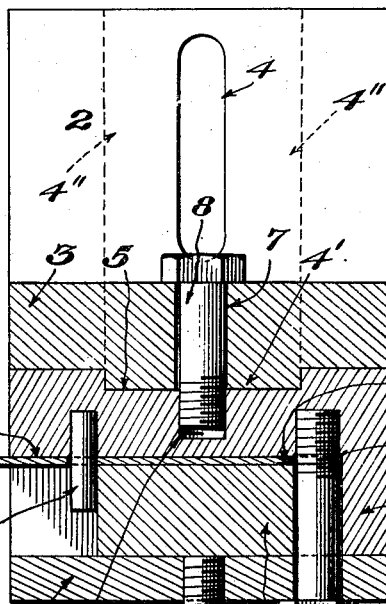
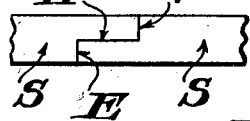
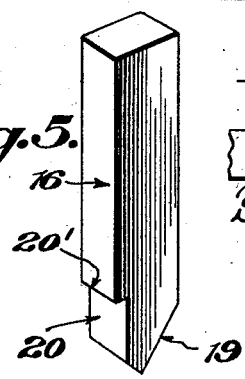
Inventor
Willis G. Davis,
By Ruess & Geier
Attorneys Dec. 8, 1942.  W. G. DAVIS  2,304,771
CUTTER
Filed April 16, 1941  2 Sheets-Sheet 2

Inventor
Walter G. Davis,
By Ruest & Geier
Attorneys

Patented Dec. 8, 1942

2,304,771

UNITED STATES PATENT OFFICE 2,304,771

CUTTER

Willis G. Davis, Pompton Plains, N. J., assignor to Ascote, Inc.

Application April 16, 1941, Serial No. 388,905

12 Claims. (Cl. 164—73)

This invention relates to cutters, and more particularly to cutters employed in forming lap joints for fiber or like composition siding used in connection with the walls of buildings or other structures.

The primary object of the invention is to provide an improved cutter structure which fixedly holds the cutter proper or cutting blade in a firm and positive manner, and which enables easy and quick adjustment of the cutter in accordance with the desired width of the lap joint.

Still further the invention aims to provide for easy and quick removal of the cutting blade and likewise application in resharpening of the blade; in applying a new blade, or in reversing the blade without removal of the cover plate.

The invention also aims to provide a cutter structure which attains the foregoing objects; which is strong and rugged; which can be economically manufactured; which is of simple and compact construction, and devoid of parts subject to derangement and which withstand rough usage.

The invention has still further and other objects which will later be set forth and of themselves manifested in the course of the following description.

In the drawings:

Fig. 1 is a perspective view of the invention;

Fig. 2 is a front elevation, parts shown in section, and with the outer or cover plate and the clamping bar removed;

Fig. 3 is a section on line 3—3 of Fig. 2;

Fig. 4 is a detail perspective view of the cutter blade;

Fig. 5 is a detail perspective view illustrative of the type of the cutter holding bar but shown of less cross-sectional area than the corresponding bar in Fig. 3;

Fig. 6 is a fragmentary detail view illustrating the type of lap joint which the invention is particularly designed to produce.

Figure 7:
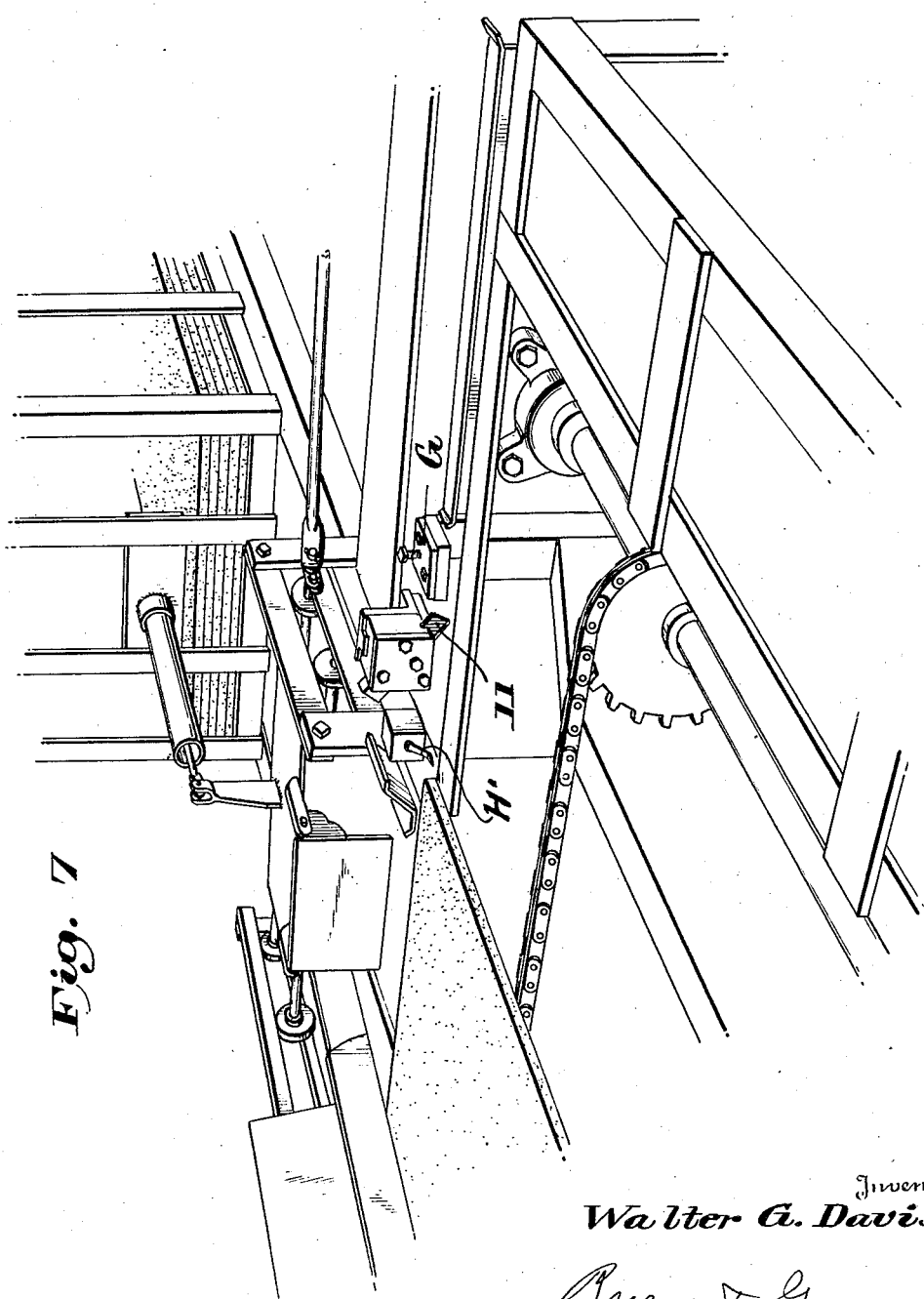
Fig. 7 is a fragmentary perspective view illustrating one use of the invention.

In proceeding in accordance with the present invention a bed plate 1, is provided and upon which is seated the base 2, of a substantially L-shaped plate the vertical member of which latter plate is designated 3. The base of the L-shaped plate is formed with a mortise and tenon 4'' and an elongated slot 4 to receive a bolt, (not shown) whereby to provide for horizontal adjustments of the plate and its fixed securement.

The front face of the vertical member 3 is formed with a tenon 4' received in a mortise 5, of a cutter holder block or base 6, whereby the block may be vertically adjusted. For the purpose of providing for such vertical adjustment of the block a vertical slot 7 is formed in vertical member 3, and receives therethrough a bolt 8 that has threaded engagement in a socket 9 provided therefor in the rear face of the holder 6.

As more clearly depicted in Fig. 2, the front face of the block 6 is formed with an inclined cut-out or grooved portion 10 providing a guide in which is removably held a cutter blade 11 which has a cutting edge 12 formed by beveling each of its sides and a notch 13 of substantially U-shape in its opposite side edge. The ends of the blade are similarly inclined as shown at 14, whereby the blade upon removal may be endwise reversed upon wear or becoming dull.

For the purpose of removably securing the blade in the holder, a pin 15 is secured to the block 6 and projects beyond the blade receiving groove or guide 10, and which is received in the notch 13 of the blade, whereby the blade is held against longitudinal movements. In order to firmly hold the blade in its groove 10, a clamping bar 16, is provided which has its rear face engaged against the outer face of the cutter. The front face of the bar 16 is engaged by an outer or cover plate 17 held in position by a series of bolts 18, that are threaded into the block 6.

The lower end of the clamping bar is inclined at 19, and cut away at 20, to provide free space through which either end of the blade projects in the performance of its cutting action, and to also lie flush with the adjacent end and bottom of the plate 17 to thus avoid any objectionable projections, and in the instance of the inclined edge 19, to avoid interference in cutting, as now to be evidenced.

The clamping bar 16, is slidable and secured in position by means of a bolt 21, the inner end of which is impinged against the front face of the bar and thereby moved against the blade to hold the latter firmly or fixedly against movement.

It will be understood that the bed 1, is suitably secured to or it is itself moved by any reciprocating member that has a platen or other work rest disposed below and associated therewith, not shown, and over which latter the cutter moves. The slot 4 of the L-shaped plate, that is formed in the base thereof, is to receive a bolt, also not shown, whereby the vertical plate and therewith the cutter and its holding means may be horizontally adjusted to vary the width of the cut which the cutter is to make in the siding.

The cutout 20, also forms a shoulder 20' which upon insertion of the clamping bar 16 acts as a stop upon engaging pin 15, (Fig. 3) so as to limit movement of the bar and to properly position its end 19, in its flush relation to the plate 17, as above stated.

It will be apparent that by loosening the bolt 21, the holding bar 16 can be slid to the right of Fig. 1, and removed. This removal of the bar results in sufficient space between the blade and the cover plate 17, to enable the blade to be manually tilted, and disengaged from the pin 15, following which the blade can be completely removed from the device and endwise reversed and then replaced. Or the blade may be resharpened and then replaced or a new cutter substituted, as conditions may require. The bar 16 is then reinserted and bolt 21 manipulated to secure same in position as above mentioned. Thus it is not necessary to disturb the cover plate and its fastening bolts 18.

In operation, to illustrate one use of the invention, the cutter by manipulation of the bolt 8 is vertically adjusted with respect to the work table to effect the depth of the cut as shown at V in the siding S, the latter resting on the table and fed past the cutter. The cutter is also horizontally adjustable by means of the slot 4 and the bolt (not shown) extending through the slot. The width of the cut H, is established by the position of the cutter relative to fixed guides G on the frame of the machine on which latter the cutter is mounted.

The cut H can be made by a horizontal cutter H', as shown in Fig. 7, wherein there is also a gage G illustrated which determines the spacing of the cut V from the edge E. The invention resides in the cutter implement, or structure per se, the foregoing uses being merely by way of example, or illustrative. The device may also be manually propelled, by use of a straight edge as a guide, or a pencilled line.

It is also to be expressly understood that the herein disclosure of the invention is the preferred embodiment thereof, and is subject to such changes, variations or modifications, as may fall within the scope of the appended claims.

What is claimed is:

1. A cutter device including, a bed, a substantially L-shaped plate on the bed, means to adjust the plate relative to the bed, a holding block, means to mount the block on the vertical member of the plate for vertical movements, means to secure the block in adjusted position, said block having an inclined groove on its front face for receiving a cutter blade which latter has a cut-out in its edge opposite to its cutting edge, a pin carried by the block and receivable in said cut-out of the cutter blade, a removable holding bar engaged with the cutter blade to hold same in its groove, a cover plate engageable with the holding bar, means to secure the cover plate to the block, and means to adjustably effect engagement of the bar with the cutter and to provide for removal of the bar, thereby to enable the cutter blade to be tilted and disengaged from the pin and then removed, through the space occupied by the bar and without disturbing the cover plate.

2. A cutter device in accordance with claim 1, wherein the means to adjustably effect engagement of the bar with the cutter consists of a bolt threaded through the cover plate and having a free end impinged against the bar.

3. A cutter including a body, having an inclined guide to receive a cutter blade having a notched edge with an end of the blade projecting beyond the bottom of the body, a work engaging guide spaced rearwardly from the cutter to determine the width of the cut, means carried by the body to engage in the notch of the cutter blade to hold the latter against longitudinal movement, a cover plate secured to the body and spaced forwardly of the guide, a removable cutter blade clamping member in said space between the guide and cover plate, and said space being of such depth so that upon removal of said clamping member the cutter blade may be tilted to disengage same from said means which engages in the notch of the cutter blade and the latter then removed without disturbing the cover plate, and means carried by the cover plate to adjustably secure the clamping member against the cutter blade.

4. A cutter in accordance with claim 3, wherein the means to adjustably secure the clamping member against the cutter blade consists of means threaded through the cover plate and having a portion impinged against the clamping member.

5. A cutter in accordance with claim 3, wherein the body is both vertically and horizontally adjustable with respect to the work engaging guide to determine the depth of the cut and its width.

6. A cutter device including a body having a fixed front and guiding means on its interior spaced from the front of the body to receive therein a cutter having a notch, means carried by the body to engage in the notch of the cutter to hold the latter against longitudinal movement, a cutter clamping member removably received in such space, and the latter being of such size so that upon removal of the member the cutter can be tilted out of engagement with said means and removed from the body while the front remains fixed, and means to effect clamping of the clamping member against the cutter to hold the latter against movement out of engagement with the guiding means.

7. A cutter device in accordance with claim 6, wherein the clamping member has means to engage the means that engages in the notch of the cutter whereby to limit movement of the clamping member into the device.

8. A cutter device in accordance with claim 6, wherein the means to effect clamping of the cutter against movement out of engagement with the guiding means consists of a bolt operable exteriorly of the body and having threaded engagement therewith and having a free end impinged against the clamping member.

9. A cutter device in accordance with claim 6, wherein the clamping member has means to engage the means that engages in the notch of the cutter, whereby to limit movement of the clamping member into the device, and wherein the means to effect clamping of the cutter against movement out of engagement with the guiding means consists of a bolt operable exteriorly of the body and having threaded engagement therewith and having a free end impinged against the clamping member.

10. A cutter device including a body having a normally fixed front with a space between the rear of the front and the adjacent part of the body and having guiding means communicating with the space to receive a cutter having a cutaway part, means carried by the body and engageable in the cutaway to retain the cutter against longitudinal movements, removable means receivable in said space to hold the cutter in the guiding means, said space between the front and adjacent part of the body being of such size so that upon removal of the holding means the cutter may be tilted out of engagement with its retaining means and removed from the body while the front of the latter remains fixed and releasable means carried by the front of the body, to exert and sustain pressure against the holding means thereby to clamp the cutter in the guiding means, and in engagement with its retaining means.

11. A cutter device in accordance with claim 10, wherein the means to exert and sustain pressure against the holding means consists of a means operable exteriorly of the body and threadedly engaged therewith and having a portion impinged against the cutter holding means.

12. A cutter device including a body portion having a rear wall and a normally fixed front wall with a space between the walls, guiding means on one of said walls communicating with said space, a cutter having a slitting edge receivable in the guiding means, on one of said walls to engage and fixedly retain the cutter against longitudinal movements with said slitting edge thereof projecting from the body to a predetermined extent, removable means receivable in said space to hold the cutter in the guiding means, said space between the walls being of such depth so that upon removal of the holding means the cutter may be moved laterally of its plane to disengage same from its retaining means and then removed from the body through said space without disturbing the fixed front wall, and releasable means carried by one of said walls to exert and sustain pressure against the holding means thereby to clamp the cutter in the guiding means and in engagement with its retaining means.

WILLIS G. DAVIS.